June 20, 1933.  F. L. MAIN  1,914,575
DISK WHEEL HUB
Filed July 2, 1930   2 Sheets-Sheet 1
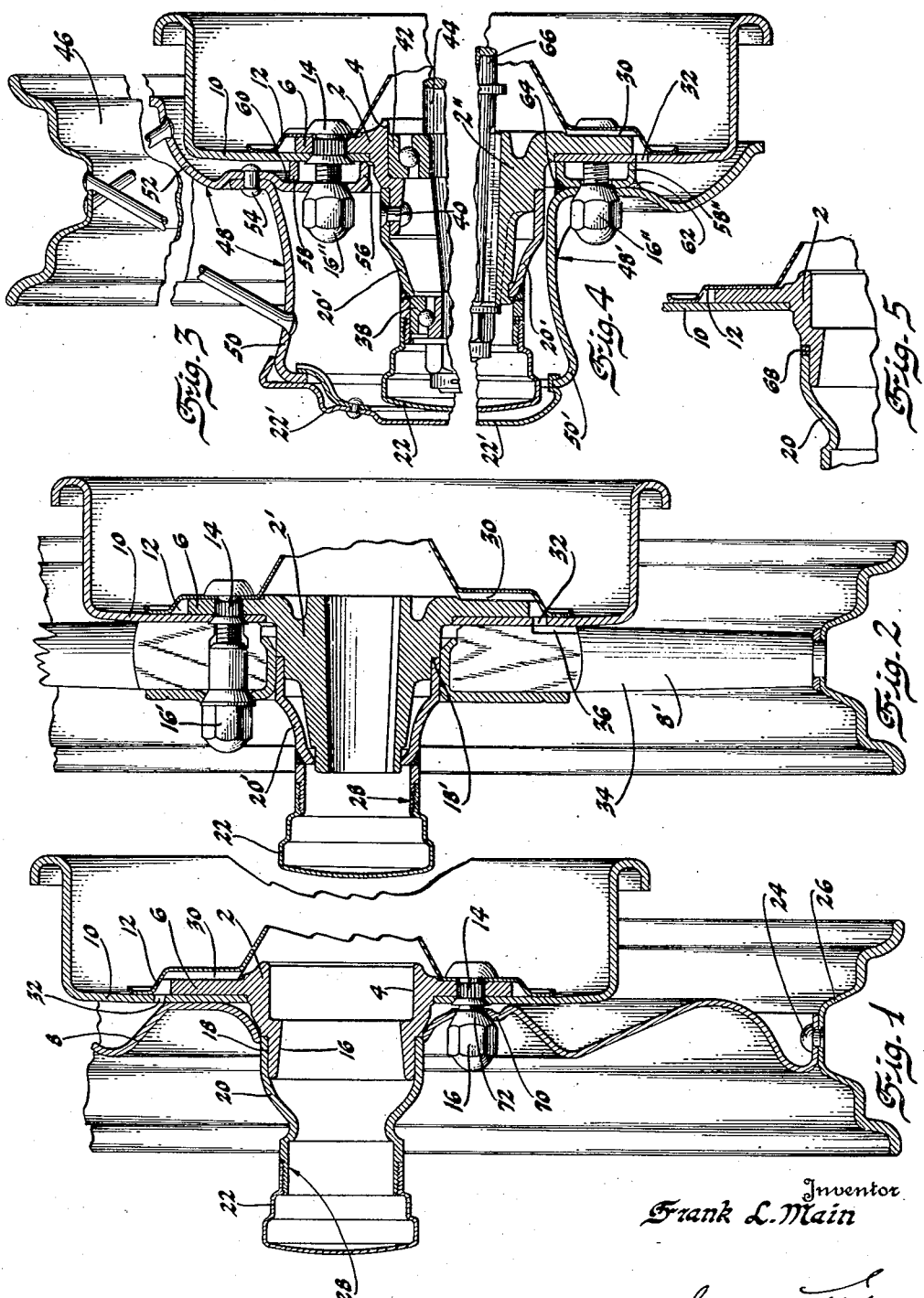
Inventor
Frank L. Main
By Blackmore, Spencer & Hulse
Attorneys

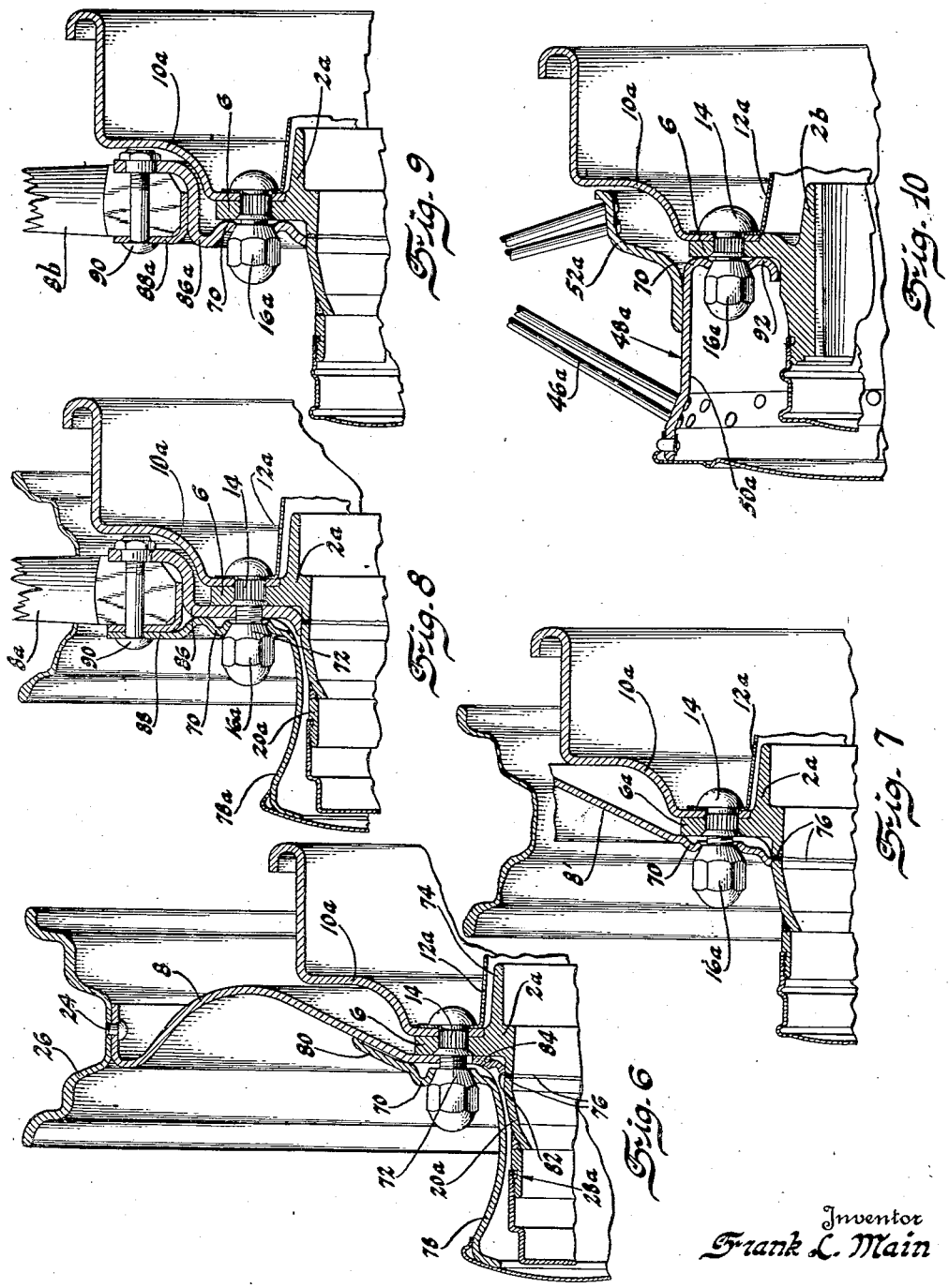

Patented June 20, 1933

1,914,575

UNITED STATES PATENT OFFICE

FRANK L. MAIN, OF JACKSON, MICHIGAN, ASSIGNOR, BY MESNE ASSIGNMENTS, TO KELSEY-HAYES WHEEL CORPORATION, A CORPORATION OF NEW YORK

DISK WHEEL HUB

Application filed July 2, 1930. Serial No. 465,282.

This invention relates to wheels and has particular reference to the structure of an axle hub for the positioning of demountable wheels.

The invention is particularly applicable to automotive vehicles having a pair of front and a pair of rear wheels. The particular novelty to the invention resides in the use of an oil deflector and brake drum for each wheel. The oil deflectors and brake drums are interchangeable for front and rear wheels; that is, the oil deflector and brake drum of either of the front wheels may be removed and applied to the rear wheels and vice versa.

The hub of the invention, which may be termed the axle hub, is also adapted to interchangeably receive without alteration any one of the various types of wheels, such as wire, wood and disk.

On the drawings:

Figure 1 is a section through the axle hub and a wheel of the invention with the tire and rim omitted and showing a disk wheel.

Figure 2 is a view similar to Figure 1 of a slightly modified form of the invention and showing a wooden wheel in place.

Figures 3 to 10, inclusive, are sections through the hub of the invention showing modified forms of hubs adaptable to wood, wire, or disk wheels.

Referring to the drawings, the numeral 2 indicates the novel axle hub of the invention. The hub includes the portion 4 adapted to receive one of the bearing races for the axle and the annular flange portion 6 to which there is secured the wheel 8, brake drum 10 and oil deflector 12. Parts 6, 10 and 12 are secured together by means of rivets 14 while the wheel 8 is rigidly mounted on the flange 6 by means of the headed bolts 16.

The head 2 includes the outer portion 16 having the annular shoulder 18 thereon. Over the shoulder 18, there is received the exterior stamped shell portion 20 which extends away from the wheel and has threaded thereon the hub cap 22. Parts 20 and 18 are secured together in any suitable way such as by welding, sweating or riveting. At the portion 28 of the shell 20, there is received the second or outer race of the bearing to support the wheel.

The wheel 8 is shown of the disk type and is secured by means of the rivets 24 to the felly 26 which is adapted to receive the rim of the usual tire (not shown).

The rivets 14 hold the oil deflector 12 rigidly against the flange 6. In order to allow excess lubricant from the axle to escape and prevent it from reaching the brake drum, each oil deflector 12 is provided with one or more pressed-out channels or passages 30 which conform to openings 32 in the brake drum to allow the excess oil to flow away.

Figure 2 shows a slightly modified form of axle hub 2'. The hub has the flange 6 to which are secured the brake drum 10 and oil deflector 12 by means of the rivets 14 in the manner shown and described in connection with Figure 1. The shell stamping 20' is secured to the forged hub 2' at the shoulder 18' in any suitable way. The stamping 20' has the cap 22 screwthreaded thereon and is adapted to receive the bearing race at the portion 28. The deflector has the channel 30 adapted to pass excess lubricant to the opening 32 in the brake drum 10. The species of Figure 2 shows a wooden spoke wheel 8' although the disk wheel 8 of Figure 1 could be mounted thereon just as well. The headed bolts 16' are somewhat longer than the bolts 16 but perform the same function of securing the wheel 8' to the hub flange 6. One or more of the wooden spokes 34 will be provided with suitable cut-out portions or passages 36 which will conform to the openings 32 in the brake drum 10.

Figure 3 shows a further modification in which the axle hub 2 is the same as that shown in Figure 1. The stamped shell 20' is the same as that shown in connection with Figure 2 and receives the bearing race 38 in its outer portion. The member 20' is shown as secured to the axle hub 2 by means of the rivets 40 although welding or sweating may be used. The inner ball race 42 is shown as received in the portion 4 of the axle hub. The axle is shown at 44 and is mounted in both bearings 38 and 42. Figure 3 shows a wire wheel 46 mounted on the hub flange 6. The wire wheel includes the wheel hub 48 comprising the two members 50 and 52 secured together by means of rivets 54. The member 52 extends inwardly toward the flange 6 and has the annular flange 56 which abuts against the edge of the brake drum 10. The ring 58 is secured to the member 48 by welding as at 60 and projects toward the drum 10 in parallelism of the flange 56. The headed bolts 16″ secure the wire wheel to the flange 6. The cap portion is shown at 22′ covering the end of the shell portion 50 of the wheel hub 48.

Figure 4 shows a modification of the structure of Figure 3 in which the shell portion 50′ of the wheel hub 48′ is shaped so that the bolts 16″ may be applied from the outside of the hub. Instead of the flange 56 and the rim 60, the wheel hub has the ring 58″ channel-shaped in cross-section and secured thereto by welding as at 62 and 64. Figure 4 shows the rear axle 66 as distinguished from the front axle 44 of Figure 3. In the case of the rear axle, the bearings 38 and 42 are not necessary and the axle hub 2″ is therefore shaped substantially similar to the axle hub portion 2′ of Figure 2. The shell portion 20′ is the same as in the species of Figure 3.

In the species of Figures 1 to 4, inclusive, while different types of wheels such as disk, wood, and wire wheels have been shown, the structures of the various figures nevertheless lend themselves to the application of any one of the three types of wheels. The openings for the bolts 16, 16′ or 16″ are all equally spaced and radially arranged in the same way so that the various openings will conform and permit any one of the three types of wheels to be attached. For instance, if it is desired to change the disk wheel 8 of Figure 1, it may be removed by removing the bolts 16. The wood wheel 8′ of Figure 2 or the wire wheels 46 of Figures 3 or 4 may then be applied over the shell 20 and axle 44 and secured in place by either the bolts 16′ or 16″. Similarly, the oil deflectors 12 and the brake drums 10 of all the figures are the same for front and rear wheels and are interchangeable. That is, the oil deflector and brake drum on either of the two front wheels may be placed on either of the two rear wheels. This necessitates but one form and size of brake drum and deflector.

In Figures 1 and 2, the shells 20 and 20′ are secured to the axle hubs 2 and 2′ by sweating. In the species of Figure 3, the shell and axle hub are secured together by riveting. In the species of Figure 5, the axle hub 2 and shell 20 are secured together by welding as at 68.

Referring to Figures 1 and 6 to 9, inclusive, it will be seen that the various flanges or disks for securing the wheels to the annular flange 6 of the axle hub 2, are provided with conical flanged holes 70 to receive the tapered or conical portion 72 of the securing bolts. The purpose of this structure is to give the necessary spring tension to the clamping nuts and is limited to an area surrounding the bolt hole.

Referring to Figures 6 to 9, inclusive, which show different modifications of the structure shown on sheet 1, it will be seen that the axle hub 2a of Figure 6 has an inwardly directed annular flange 74 for the reception of the bearing race. The axle hub 2a has welded thereto as at 76 the shell portion 20a and receives the bearing race at 28a. An outer shell portion 78 surrounds the shell 20a and has formed integral therewith the annular flange 80 in which there is formed the tapered opening 70. The brake drum 10a is secured to the inside instead of the outside of the flange 6 and is of somewhat different shape. The oil deflector 12a also has a different shape and both are secured to the flange 6 by means of rivets 14. The disk wheel is shown at 8 and has secured thereto the usual felly 26. The disk wheel 8 (Figure 6) may, if desired, have pressed therefrom a plurality of tongues 82 against which the inner portion of the outer shell 78 is adapted to rest when in position. A weld 84 may be applied at each tongue 82.

Figure 8 shows an axle hub 2a, shell 20a, brake drum 10a and oil deflector 12a, the same as in Figure 6. A wooden spoke wheel 8a is shown as mounted on the axle hub. The hub of the wood wheel 8a comprises the inner annular member 86 and the outer annular member 88 secured to the spokes by means of the bolts 90. The outer member 88 has formed integral therewith the outer shell portion 78a which covers the inner shell 20a. By removing the bolts 16a, the outer shell portion 78a will be removed with the shell 8a.

Figure 9 shows a different way of attaching the wooden spoke wheel 8b. The hub of the wheel comprises the outer member 88a and the inner member 86a secured to the wheel by means of the bolts 90. The member 86a is formed quite similarly to the member 86 while the member 88a has no shell portion 78a formed integral therewith. The member 88a is angular in cross-section as shown in Figure 9 and has its angular portion abutting against the sides and edges of the spokes. The inner annular member 86a is Z-shaped in cross-section and has one leg of the Z abutting the inner side of the spokes, the web of the Z at the end of the spokes and the second leg of the Z abutting against the flange 6 of the axle hub portion 2a. Suitable bolts 16a are provided to secure the wheel hub to the flange 6.

Figure 7 differs from the structure of Figure 6 in that the disk wheel 8' is secured directly to the flange 6a without the intermediary of the shell 78 and its flange 80.

Figure 10 shows a wire wheel 46a applied to a rear wheel hub 2b. The wire wheel has the hub 48a comprising the outer member 50a and the inner member 52a. The outer member 50a has the inwardly directed annular flange 92 provided with suitable openings to receive the bolts 16 to secure the flange 92 and wheel hub 48a to the flange 6 of the axle hub 2b.

In all of the species of sheets 1 and 2, all of the wheels, whether a wood, wire or disk, are interchangeable one with the other and regardless of whether they are front or rear wheels. Similarly, in the species of Figures 6 to 10, inclusive, the brake drum 10a and oil deflector 12a are likewise interchangeable for both front and rear wheels.

I claim:

1. In an axle hub structure adapted to receive a plurality of bearings, a forging for one bearing, and a stamping rigidly united to said forging for receiving another bearing.

2. An axle hub structure comprising a shell member having a portion complementary to differently formed hubs and attachable to the latter, said member having another portion extending axially outwardly from the portion aforesaid and having a bearing receiving surface.

3. An axle hub structure comprising a shell member having a portion complementary to front and rear hubs and attachable to the latter, said member having another portion extending axially outwardly from the portion aforesaid and provided with a bearing receiving surface.

4. An axle hub structure comprising a hub section complementary to wheels having differently formed central portions for alternately receiving the latter and having an extension for the section aforesaid complementary to differently formed hub sections, said extension having a bearing engaging surface.

In testimony whereof I affix my signature.

FRANK L. MAIN.